United States Patent [19]
Kawamura et al.

[11] Patent Number: 5,623,960
[45] Date of Patent: Apr. 29, 1997

[54] SOLENOID-OPERATED VALVE FOR THERMALLY INSULATED PIPING AND ATTACHMENT CONSTRUCTION THEREFOR

[75] Inventors: Hideki Kawamura, Hyogo-ken; Yoji Mori; Minoru Ueta, both of Komaki, all of Japan

[73] Assignees: Teisan Kabushiki Kaisha, Japan; L'Air Liquide, Societe Anonyme Pour L'Etude Et L'Exploitation Des Procedes Georges Claude, France

[21] Appl. No.: 436,422

[22] PCT Filed: Dec. 17, 1993

[86] PCT No.: PCT/JP93/01839

§ 371 Date: May 23, 1995

§ 102(e) Date: May 23, 1995

[87] PCT Pub. No.: WO94/15127

PCT Pub. Date: Jul. 7, 1994

[30] Foreign Application Priority Data

Dec. 18, 1992 [JP] Japan .................... 4-337744

[51] Int. Cl.⁶ .................... F16L 7/00; F16K 49/00
[52] U.S. Cl. .................... 137/375; 137/315; 137/334; 251/129.21
[58] Field of Search .................... 137/375, 334, 137/15, 315; 251/129.21

[56] References Cited

U.S. PATENT DOCUMENTS 3,833,015  9/1974  Kneuer .................... 251/129.21

FOREIGN PATENT DOCUMENTS 48-66222    9/1973   Japan.
61-252984   11/1986  Japan.
62-110086   5/1987   Japan .................... F16K 31/06

*Primary Examiner*—A. Michael Chambers
*Attorney, Agent, or Firm*—Webb Ziesenheim Bruening Logsdon Orkin & Hanson, P.C.

[57] ABSTRACT

The present invention relates to a solenoid-operated valve for a thermally insulated piping having a thermally insulated outer periphery suitable for transporting low-temperature fluid, high-temperature fluid or the like and relates also to an attachment construction for the valve.

Conventionally, with this type of solenoid-operated valve for a thermally insulated piping, since it is necessary to to increase a magnetic flux density of the solenoid coil by increasing the number of turns of the oil or the electric current to be applied thereto, there has been the problem of high production costs and running costs.

In the case of the solenoid-operated valve for a thermally insulated piping according to the present invention, inside a heat-insulating layer (6) surrounding flow passages (7, 20, 21, 26, 33) in the form of a pipe, there is provided a fixed core (23) constituting a magnetic circuit between a solenoid coil (17) and a movable coil (18). Then, magnetic resistance between the solenoid coil and the movable core may be reduced, without entailing enlargement of the movable core and the production costs and the running costs may be reduced.

6 Claims, 5 Drawing Sheets

SOLENOID-OPERATED VALVE FOR THERMALLY INSULATED PIPING AND ATTACHMENT CONSTRUCTION THEREFOR

TECHNICAL FIELD

The present invention relates to a solenoid-operated valve for a thermally insulated piping having a thermally insulated outer periphery suitable for transporting low-temperature fluid, high-temperature fluid or the like and relates also to an attachment construction for the valve. The invention relates more particularly to a solenoid-operated valve for a thermally insulated piping and to an attachment construction for the same, said valve including a solenoid coil disposed outside a heat-insulating layer surrounding flow passages, a movable core disposed inside the heat-insulating layer to be reciprocated along a longitudinal direction of the flow passages in response to a magnetizing/demagnetizing action of the solenoid coil and a valve member disposed inside the heat-insulating layer to open or shut the flow passage in response to the reciprocating movement of the movable core.

BACKGROUND ART

According to the above-described solenoid-operated valve for a thermally insulated piping, a solenoid coil is disposed outside a heat-insulating layer which surrounds flow passages in the form of a pipe, and inside the heat-insulating layer, there are provided a movable core and a valve member operable to open or shut the flow passage in response to a reciprocating movement of the movable core. Then, the valve member disposed inside the heat-insulating layer may be opened or shut in association with a magnetizing/demagnetizing action of the solenoid coil, while restricting heat conduction from the inside to the outside of the heat-insulating layer. According to the conventional art, a magnetic circuit is comprised solely of the movable core disposed inside the heat-insulating layer to be movable in response to a magnetizing/demagnetizing action of the solenoid coil (for example, see Japanese laid-open patent gazette Sho. 61-252984).

For this reason, the magnetic resistance between the solenoid coil and the core is large. Then, in order to allow the movement of the movable core associated with magnetization of the solenoid core to take place in a reliable manner, it is necessary to increase the magnetic flux density by increasing either the number of turns of the coil or the electric current, thus resulting in problem of high production costs or high running costs.

In order to solve this problem, it is conceivable, for instance, to provide the movable core with a sufficient length in the longitudinal direction of the flow passage, thereby to minimize the magnetic resistance between the solenoid coil and the movable core. In this case, however, as the movable core is enlarged, the load needed for its movement is increased as well. As a result, just like the aforedescribed conventional art, for the reliability of movement of the movable core, it becomes again necessary to intensify the magnetic flux density of the solenoid coil by increasing the number of turns or the value of electric current to be applied thereto.

The present invention attends to the above-described state of the art, and an object of the invention is to provide a solenoid-operated valve for a thermally insulated piping and its attachment construction, which allow reduction in the production costs and running costs through ingenious arrangement of an interior construction of the heat-insulating layer.

DISCLOSURE OF INVENTION

For fulfilling the above-noted object, in the above-described solenoid-operated valve for a thermally insulated piping, the construction according to the present invention is characterized in that inside the heat-insulating layer there is provided a fixed core constituting a magnetic circuit between the solenoid coil and the movable core.

The above-described construction achieves functions and effects as follow.

The magnetic resistance between the solenoid coil and the movable core may be reduced, without entailing enlargement of the movable core. Accordingly, the production costs or running costs may be reduced.

With the solenoid-operated valve for a thermally insulated piping according to the present invention, said valve member, said movable core and said fixed core may be held inside said heat-insulating layer in a manner allowing integral attachment thereto.

With this construction, since the valve member, the movable core and the fixed core are held inside the heat-insulating layer in a manner allowing their integral attachment thereto, the assembly operations of the valve member, the movable core and the fixed core inside the heat-insulating layer may be advantageously simplified.

According to the characterizing features of an attachment construction for a solenoid-operated valve for a thermally insulated piping relating to the present invention, in an attachment construction for a solenoid-operated valve for a thermally insulated piping in which a solenoid coil is disposed outside a thermally insulated pipe having flow passages surrounded by a heat-insulating layer and the thermally insulated pipe accommodates therein a valve mechanism including a valve member operable to open or shut said flow passage in response to a magnetizing/demagnetizing action of said solenoid coil, said attachment construction is characterized in that said valve mechanism is fixed to a connecting end of a connecting member detachably connected and communicated with a pipe end portion of said thermally insulated pipe and that said valve mechanism fixed to said connecting member is inserted from said pipe end portion of the thermally insulated pipe into the interior of this thermally insulated pipe.

With this construction, the valve mechanism fixed to the connecting end of the connection member may be inserted from the pipe end portion of the thermally insulated pipe into the interior of this thermally insulated pipe to be attached therein; and the valve mechanism may be withdrawn from the interior of the thermally insulated pipe by detaching the connecting member from the thermally insulated pipe.

As a result, this attachment construction of a solenoid-operated valve for a thermally insulated pipe may advantageously facilitate the attaching operation of the valve mechanism into the thermally insulated pipe axed maintenance and inspection operations of the valve mechanism attached inside the thermally insulated pipe.

The valve mechanism may be detachably fixed to the connecting end of the connecting member.

If the valve mechanism is detachably fixed to the connecting end of the connecting member as described above, the valve mechanism which has been withdrawn from the interior of the thermally insulated pipe may be detached from the connecting member.

As a result, the maintenance and inspection operations of the valve mechanism may be further facilitated. And, moreover, the valve mechanism may be readily replaced.

BEST MODE FOR CARRYING OUT THE INVENTION

Figure 1:
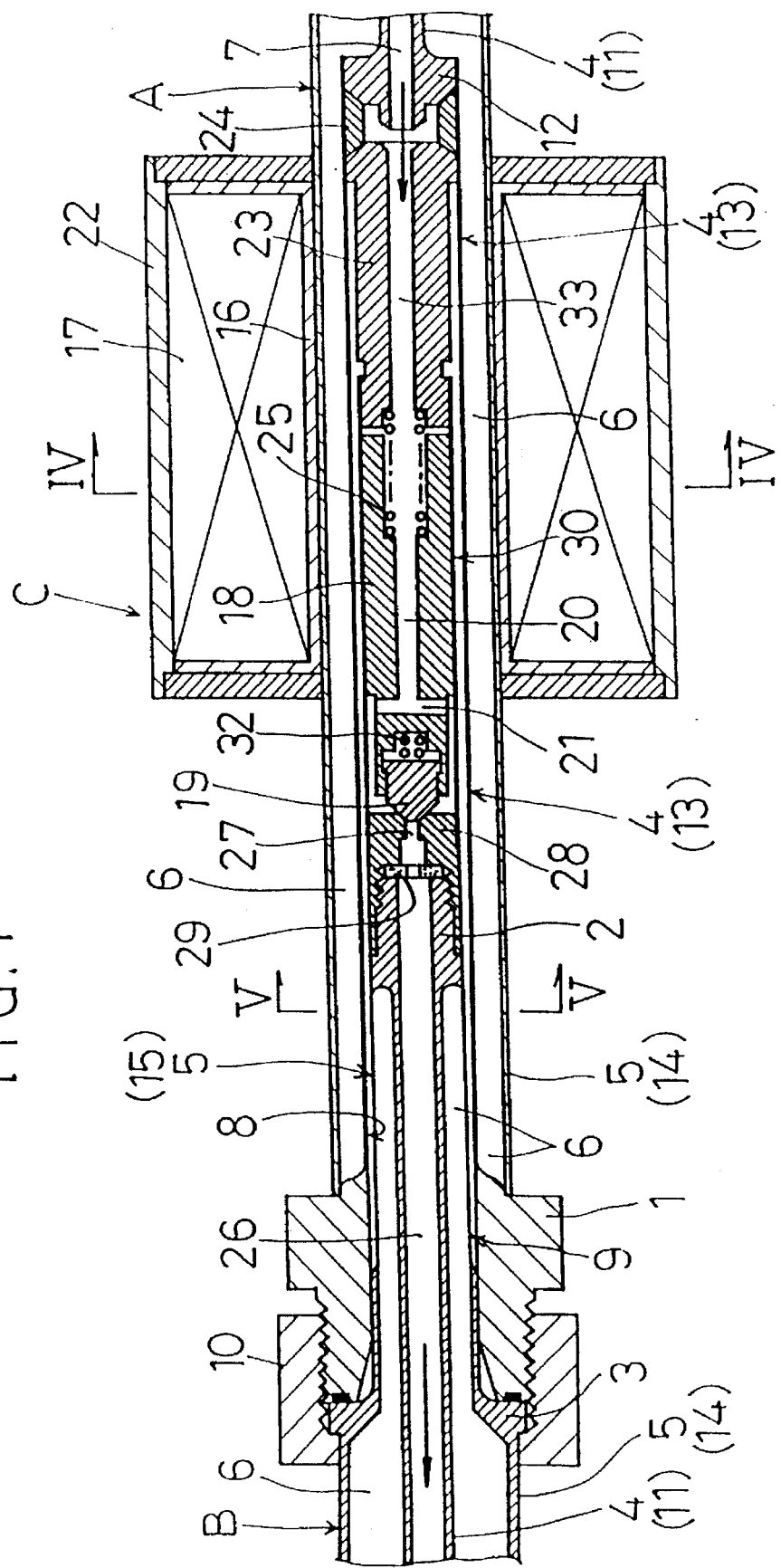
FIG. 1 is a section view of a piping construction employing a solenoid-operated valve for a thermally insulated piping relating to one embodiment of the present invention.
Figure 2:
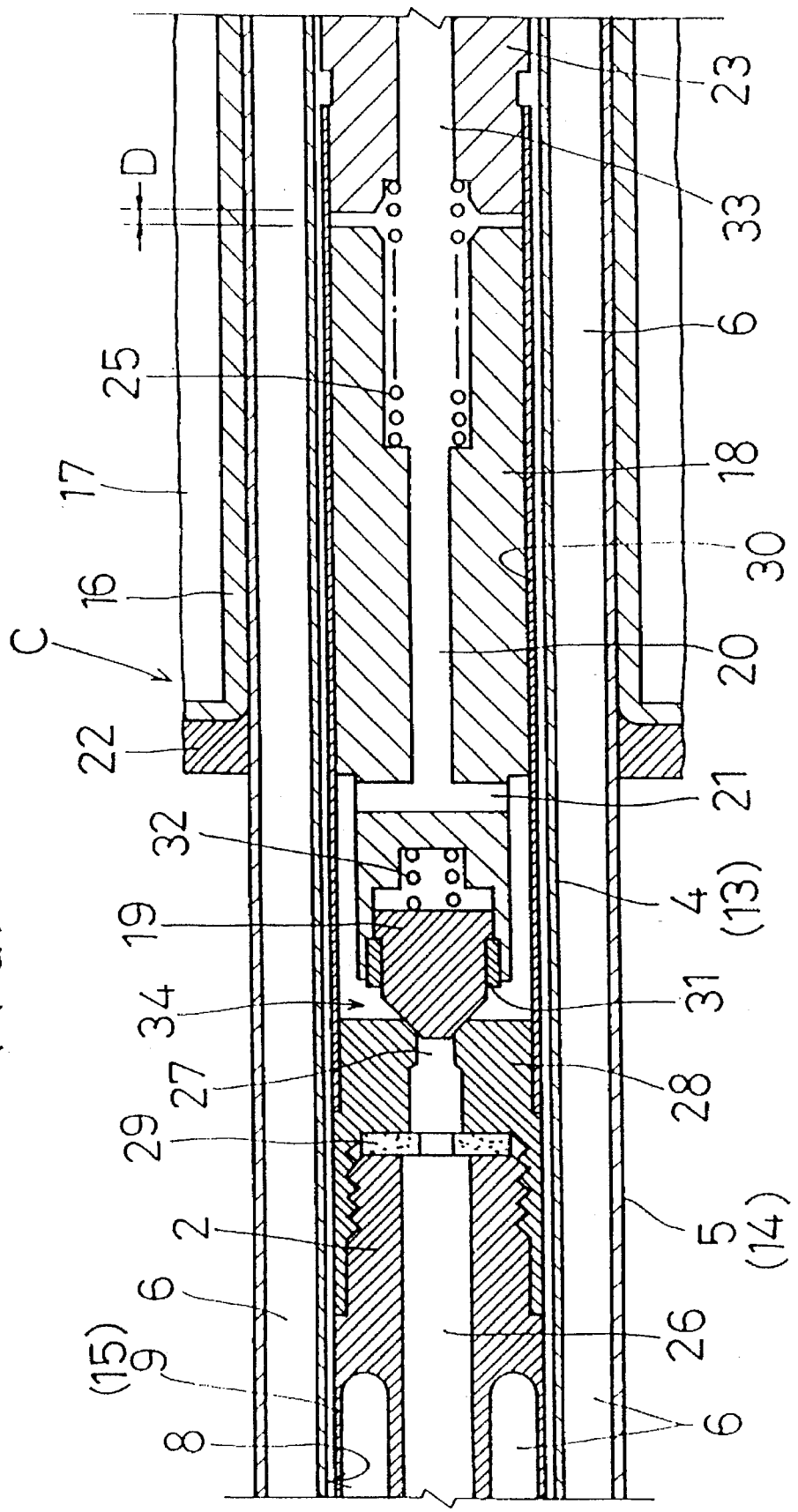
FIG. 2 is an enlarged section view of major portions of FIG. 1 construction in a condition where a solenoid coil is not supplied with electric power.
Figure 3:
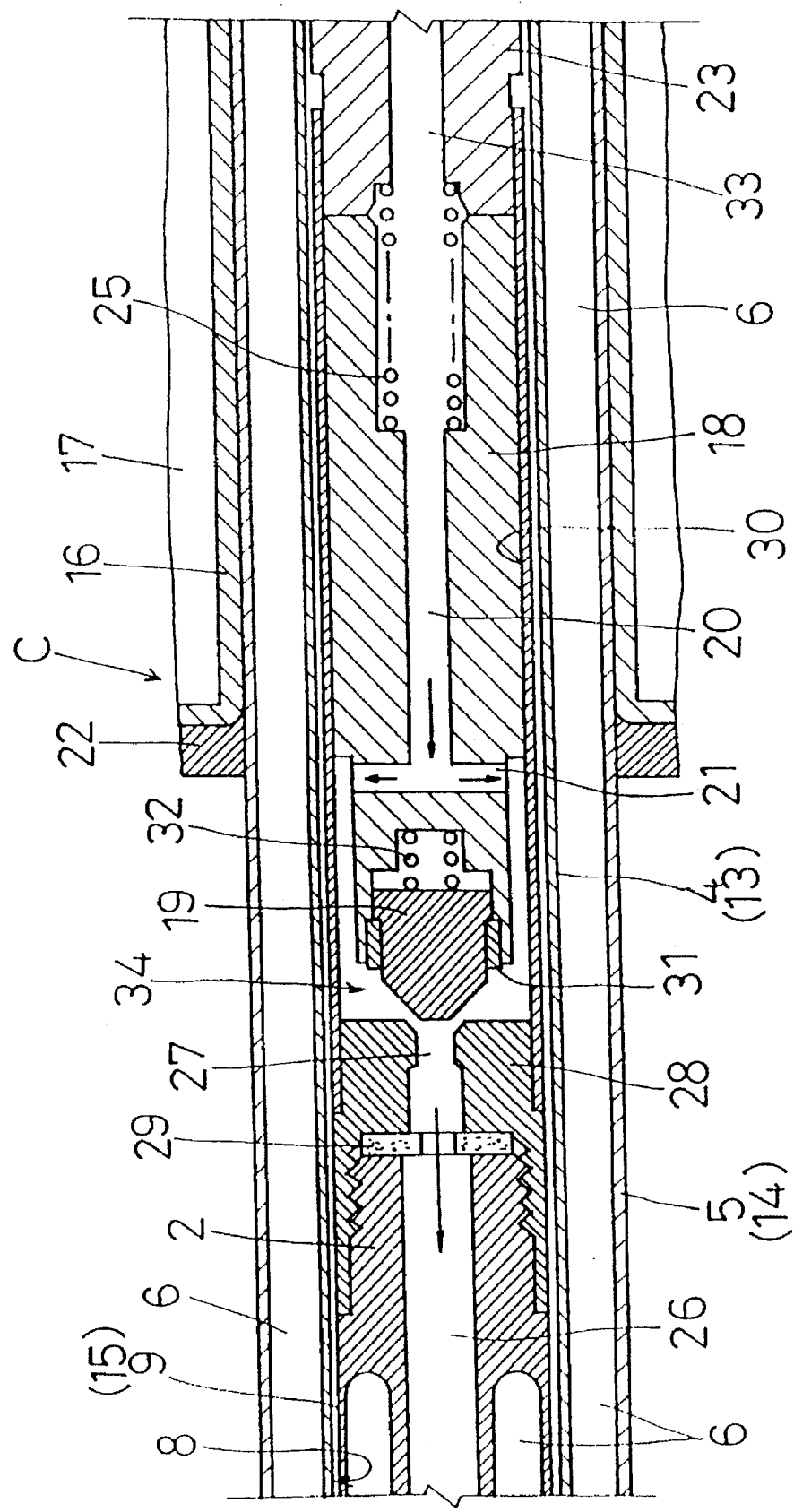
FIG. 3 is an enlarged section view of the major portions of FIG. 1 construction where the solenoid coil is supplied with electric power.
Figure 4:
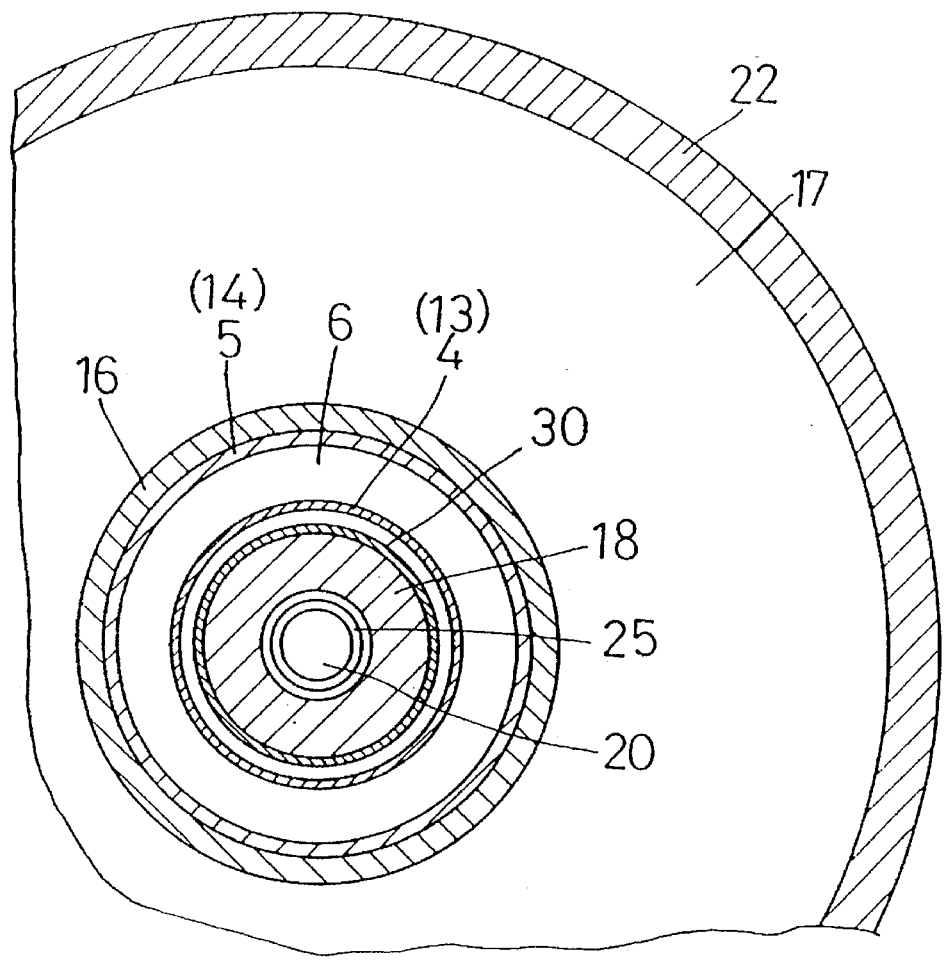
FIG. 4 is a section view taken along a line IV—IV of FIG. 1.
Figure 5:
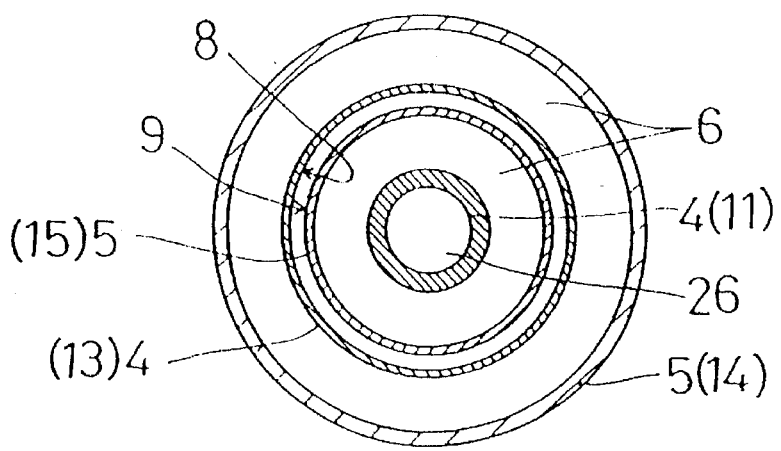
FIG. 5 is a section view taken along a line V—V of FIG. 1.

FIGS. 1 through 3 show a construction of piping for transporting liquid nitrogen incorporating a solenoid-operated valve C at a connecting portion between transport pipes A, B for transporting liquid nitrogen to a location where the liquid nitrogen is to be used or to a reservoir tank or the like.

The transport pipes A, B are formed of a stainless steel (SUS316L) having a relatively low relative permeability and are provided as a double-pipe construction in which an inner pipe 4 and an outer pipe 5 are welded to pipe-end fittings 1, 2. Between the inner pipe 4 and the outer pipe 5, there is formed a vacuum type heat-insulating layer 6 which surrounds flow passages 7, 20, 21, 26, 33 in the form of tubes. A large-diameter receiver hole 8 communicating with the upstream-side flow passage 7 is formed on an inner periphery of a terminal end of the upstream-side transport pipe A, and a small-diameter insert portion 9 provided on an outer periphery of a terminal end of the downstream-side transport pipe B is inserted into the receiver hole 8. Then, the transport pipes A, B are fixedly connected to each other by means of a cap nut 10 threaded with the pipe-end fitting 1.

The receiver hole 8 is formed by welding a large-diameter inner pipe 13 to a small-diameter inner pipe 11 via a joint fitting 12 and welding this large-diameter inner pipe 13 to the pipe-end fitting 1. The insert portion 9 is formed by welding a small-diameter outer pipe 18 to a large-diameter outer pipe 14 via a joint fitting 8 and welding this small-diameter outer pipe 15 to the pipe-end fitting 2.

The solenoid-operated valve C includes a plunger 18 formed of the stainless steel (SUS408) having a relatively high relative permeability and acting as a movable core to be reciprocated in the longitudinal direction of the flow passages in association with a magnetizing/demagnetizing action of a solenoid coil 17. The solenoid coil 17 wound about a resin bobbin 18 and a yoke 22 having a substantially 'C'-shaped radial section into which inner periphery the solenoid coil 17 together with the bobbin 18 are fitted are outwardly and fixedly engaged, in the form of a doughnut-like arrangement, on an outer peripheral face of the large-diameter outer pipe 14 outside the heat-insulating layer 6. The solenoid-operated valve further includes a valve seat member 28 defining an orifice 27 communicating with the downstream flow passage 26, a valve member 19 made of resin and operable to open or close the orifice 27 in response to the reciprocating movement of the plunger 18, and a fixed core 23 made of the same material as the plunger 18 and constituting a magnetic circuit between the solenoid coil 17 and the plunger 18. And, these components 18, 28, 19 and 23 are attached on the inner peripheral side of the large-diameter inner pipe 13 inside the heat-insulating layer 6. The plunger 18 defines flow passages 20, 21, and the fixed core 23 defines a flow passage 33 communicating the flow passages 20, 21 with the upstream flow passage 7.

Figure 6:
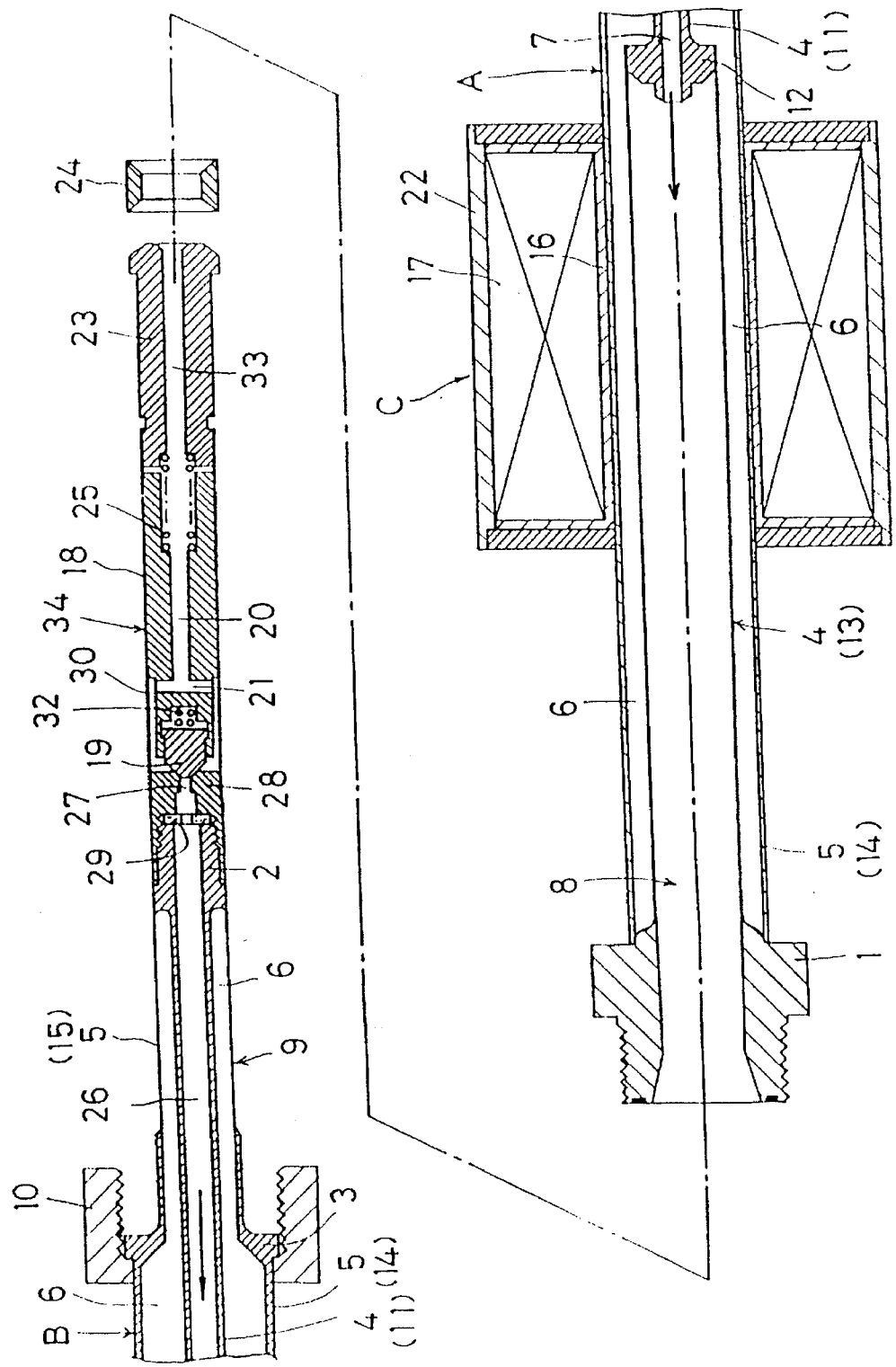
FIG. 6 is an exploded view showing an attachment construction for the solenoid-operated valve for a thermally insulated piping.

The valve mechanism 34 is provided as a unitary construction for allowing unitary attachment of this mechanism into the receiver hole 8. Then, in this mechanism 34, the fixed core 23 and the valve seat member 28 are weld-fixed to each other via a guide cylinder 30 made of a stainless steel (SUS316L) having a relatively low relative permeability, and the plunger 18 is attached inside the guide cylinder 30 to be reciprocatable along an inner peripheral face of the guide cylinder 30 in the direction of the pipe axis. Further, the valve member 19 retained against withdrawal by a press fitting 31 is attached at the downstream end portion of the plunger 18 to be axially reciprocatable. As shown in FIG. 6, the valve seat member 28 is detachably threaded, via a gasket 29, to the pipe-end fitting 2 of the thermally insulated pipe B acting as a connecting member to be detachably attached to and communicated with the pipe end portion of the thermally insulated pipe A, thereby to be integrally fixed to the transport pipe B. Then, in this condition, as the mechanism 34 together with a seal ring 24 is inserted from the pipe end portion of the thermally insulated pipe A into the receiver hole 8 of this thermally insulated pipe A, the valve mechanism 34 may be readily attached into the thermally insulated pipe A.

A coil spring 25 is provided for urging the plunger 18 in the direction away from the fixed core 23, and a further coil spring 32 is provided for urging the plunger 18 and the valve member 19 away from each other. Then, when the solenoid coil 17 is supplied with no electric power, as shown in FIG. 2, the valve member 19 closes the orifice 27 by the urging forces of the coil springs 25, 32. When the pressure inside the downstream flow passage 26 builds up above a predetermined value, the valve member 19 opens the orifice 27 against the urging forces of the coil springs 25, 32.

When electric power is supplied to the solenoid coil 17 to magnetize the same, as shown in FIG. 3, the plunger 18 is moved to the upstream side by a stroke D against the urging force of the coil spring 25 and the valve member 19 opens the orifice 2, whereby the upstream flow passage and the downstream flow passage 26 become communicated to each other via the flow passage 33 defined in the fixed core 23 and the flow passages 20, 21 defined in the plunger 18.

OTHER EMBODIMENTS (1) The solenoid-operated valve for a thermally insulated piping according to the present invention may comprise a pilot controlled solenoid-operated valve, in addition to the direct-acting type solenoid-operated valve.

(2) The solenoid-operated valve for a thermally insulated piping according to the present invention may be connected to a transport piping for transporting a high-temperature fluid such as hot water, vapor or the like, in place of a low-temperature fluid such as liquid hydrogen, liquid helium, freon or the like.

(3) The movable core moved in response to a magnetizing/demagnetizing action of the solenoid coil may be provided integrally with the valve member.

(4) The type of the heat-insulating layer surrounding the flow passages is not 1 imited to the vacuum type heat-insulating layer. Instead, the layer may comprise such material as foamed urethane or the like.

What is claimed is:

1. A solenoid-operated valve for a thermally insulated piping, said valve comprising:

flow passages;

a heat-insulating layer surrounding said flow passages;

a solenoid coil disposed outside said heat-insulating layer;

a movable core disposed inside said heat-insulating layer to be reciprocated along a longitudinal direction of said flow passages in response to a magnetizing/demagnetizing action of said solenoid coil;

a valve member disposed inside said heat-insulating layer to open or shut said flow passage in response to said reciprocating movement of said movable core; and a fixed core inside said heat-insulating layer, said fixed core constituting a magnetic circuit between said solenoid coil and said movable core.

2. The solenoid-operated valve of claim 1, wherein said valve member, said movable core and said fixed core are positioned inside said heat-insulating layer in a manner allowing integral attachment thereto.

3. The solenoid-operated valve of claim 1, wherein said movable core includes a plunger formed of stainless steel having a relatively high relative permeability.

4. An attachment construction for a solenoid-operated valve for a thermally insulated piping, said construction comprising:

thermally insulated pipe having a flow passage therein surrounded by a heat-insulating layer;

a connecting member detachably connected and communicating with a pipe end portion of said thermally insulated pipe;

a solenoid coil disposed outside said thermally insulated pipe; and a valve mechanism accommodated within said thermally insulated pipe, said valve mechanism including a valve member operable to open and shut said flow passage in response to a magnetizing/demagnetizing action of said solenoid coil, wherein said valve mechanism is fixed to a connecting end of said connecting member, and wherein said valve mechanism is inserted from said pipe end portion of said thermally insulated pipe into the interior of said thermally insulated pipe.

5. The attachment construction for a solenoid-operated valve of claim 4, wherein said valve mechanism is detachably fixed to said connecting end of said connecting member.

6. The attachment construction for a solenoid-operated valve of claim 4, wherein said heat-insulating layer comprises a vacuum type heat-insulating layer surrounding said flow passage.

* * * * *